Patented Aug. 25, 1942

UNITED STATES PATENT OFFICE 2,293,783

2,293,783

PROCESS FOR PRODUCING DIBENZANTHRONE

William R. Waldron, Wilmington, Del., and Lynne H. Ulich, Penns Grove, N. J., assignors to E. I. du Pont de Nemours & Company, Wilmington, Del., a corporation of Delaware No Drawing. Application June 24, 1941, Serial No. 399,570

4 Claims. (Cl. 260—357)

This invention relates to an improvement in the process for producing dibenzanthrone and has for its object to provide a process whereby dibenzanthrone may be produced in increased yields and purity over the processes heretofore described in the prior art.

Dibenzanthrone, which is a valuable dyestuff intermediate, was originally produced by fusing benzanthrone with caustic potash. The yields of vat soluble color, however, were low and there was later perfected a process wherein benzanthrone is fused with caustic potash in aniline. This process gave increased yields of vattable color but the yields were still far from those theoretically possible. In each of these fusions a large amount of vat insoluble material was produced which of course is not a vat dye and a substantial amount of the vat soluble fraction is not dibenzanthrone. More recently a process was perfected, as disclosed by Howell in U. S. Patents 1,993,667 and 1,993,668, in which the benzanthrone is converted substantially quantitatively to a vat soluble product. On perfecting methods of analysis it has been found that this product although it is vat soluble is not pure dibenzanthrone, for by the dimethyl sulfate purification method as more particularly described in Annalen 473, page 283, quite a large quantity of hydroxyl containing material can be eliminated therefrom.

We have found that in the process of preparing dibenzanthrone as more particularly described by Howell, U. S. P. 1,993,667 and 1,993,668, wherein benzanthrone is fused in naphthalene with alcoholic caustic potash in the presence of a flux and an oxidizing agent, the yields of dibenzanthrone can be very materially increased by adding sodium oxide ($Na_2O$) to the fusion in an amount sufficient to react with all the water that is present in the reaction mass, particularly that normally present in the potassium hydroxide, and the alcohol employed. While it appears that the increased yield may be due to the dehydration effect of the sodium oxide it also appears that the sodium oxide exerts a further chemical action in conjunction with the potassium hydroxide to produce the dibenzanthrone in higher yields and with a lesser amount of bodies which may be separated out in the dimethyl sulfate purification. An increase of yield of from 14 to 20% has been obtained by the addition of sodium oxide to the fusion mass as compared to the yields obtained by the same process where sodium oxide is not present. Commercial potassium hydroxide normally contains from 5 to 10% of water and it is exceedingly difficult to obtain it in completely dehydrated form. By the addition of sodium oxide to the fusion, a low grade potassium hydroxide can be employed without detrimental results in this process. Potassium oxide may be substituted for sodium oxide although the latter compound is not as readily available.

Since the addition of alkali metal oxide to the naphthalene caustic potash fusion decreases the fluidity of the fusion mass to some extent, a larger quantity of potassium acetate or other alkali metal salt of a lower fatty acid should be employed. We have also found that sodium phenate may be employed in addition to the normal amount of sodium acetate or equivalent flux or it may be substituted therefor. The addition of sodium phenate and sodium oxide to the normal fusion mass materally increases the yield of dibenzanthrone. Sufficient flux should be employed to give a readily stirrable mass so that complete reaction takes place.

The amount of sodium oxide employed should be sufficient to react with all of the moisture present in the reaction mass with some excess.

In the following examples the comparative yields of dibenzanthrone obtained have been determined by the dimethyl sulfate purification method suggested in Annalen 473, page 283, which is carried out in detail as follows:

20 parts of dibenzanthrone and 40 parts of soda ash are heated in 400 parts of nitrobenzene for one hour at 155–160° C. to drive off any moisture that may be present. 32 parts of dimethyl sulfate are added over a one hour period while the mass is agitated at 160° C. The mass is then heated for one hour longer at this temperature, cooled to 100° C. and filtered. The filter cake is washed with 100 parts of hot nitrobenzene at 120° C. The cake is then washed free of nitrobenzene with alcohol, then free of soda ash with water. The cake is then washed again with alcohol and dried at 100° C. The amount of dibenzanthrone recovered when compared with the amount of crude dibenzanthrone used gives the percent purity.

While it is recognized that in this dimethyl sulfate purification some dibenzanthrone may be lost in the filtrate due to some solubility in the nitrobenzene, the method has been found to be satisfactory in determining the true quality of dibenzanthrone, and such analyses give good comparative values of the actual yields of dibenzanthrone obtained by the various processes.

The following examples are given to illustrate the invention. The parts used are by weight.

Example 1

83.5 parts of methanol are charged to an iron fusion pot and 50 parts of anhydrous sodium acetate are added, followed by the addition of 175 parts of caustic potash flakes containing approximately 6% moisture. Under agitation the temperature of the melt is raised to 105° to 110° C. and 84 parts of sodium oxide are carefully added.

An additional 175 parts of caustic potash flakes (6% moisture) are then charged into the mass and the temperature raised to 128° to 132° C. under agitation. At this point 500 parts of molten naphthalene are added and the temperature of the melt adjusted to 128° to 132° C. 100 parts of benzanthrone pure are then added to the melt during the course of ¼ hour, followed at once by the addition of 75 parts of sodium nitrite. The fusion is now heated gradually to 212° to 214° C. during the course of 3 hours and held at that temperature for 1 hour or until the reaction is complete. At 170°–175° C. a vigorous reaction takes place accompanied by the evolution of ammonia gas. On continued heating the evolution of gases ceases and the reaction is complete. The fusion is now cooled to 120° C., vacuum is applied to the pot and the naphthalene is distilled off under diminished pressure. The fusion mass is now cooled to 120° C. and 1000 parts of cold water are added under agitation and stirred for ½ hour. The diluted melt is then poured into 1300 parts of water and air-blown until the color is completely oxidized. The slurry is now steam distilled to remove the last traces of occluded naphthalene. The slurry is then diluted to 6000 parts with water and filtered hot. The cake is washed alkali and color free and dried.

Analysis by the dimethyl sulfate purification method shows an increase in yield of dibenzanthrone of 14% over the yield obtained by the same process where the sodium oxide is omitted.

*Example 2*

83.5 grams of methanol are added to an iron fusion pot, equipped with agitator. 50 grams of anhydrous sodium acetate are added, followed by 175 grams of flaked caustic potash (6% moisture). Under agitation the temperature of the melt is raised to 105°–110° C. and 40 grams of sodium phenate are charged, followed by the careful addition of 84 grams of sodium oxide. An additional 175 grams of flaked caustic potash (6% moisture) is now added to the melt and the temperature raised to 128–132° C. under agitation. Now 500 grams of molten naphthalene are added and the temperature of the melt adjusted to 128–132° C. At this point 100 grams of benzanthrone pure is charged during ¼ hour, followed at once by the addition of 75 grams of sodium nitrite. The fusion is then heated slowly during 3 hours to 212°–214° C. and held 1 hour at this temperature until the reaction is complete. The fusion is worked up and the dibenzanthrone isolated as in Example 1.

Analysis by the dimethyl sulfate purification method shows an increase in yield of dibenzanthrone of 18% over the yield obtained by the same process where the sodium oxide and sodium phenate are omitted.

*Example 3*

83.5 grams of methyl alcohol is charged to a 1 liter iron fusion pot and 90.0 grams of sodium phenate added and stirred at room temperature for one half hour until a smooth slurry is obtained. The mass is then heated to 50° C. under agitation and 175 grams of potassium hydroxide (6% moisture) added. The melt is heated to 100° C. and an additional 175 grams of potassium hydroxide (6% moisture) is added and stirred for one half hour until a smooth melt is obtained. Now slowly add at 110°–120° C. 84 grams of sodium monoxide. After the heat of reaction subsides, raise the temperature of the melt to 128°–132° C. and add 500 grams of molten naphthalene. Adjust the temperature of the melt to 128°–132° and add over ¼ hour period, 100 grams of benzanthrone pure, followed at once by the addition of 75 grams of sodium nitrite.

The fusion is now heated to 212°–214° C. over a 3 hour period and held at this temperature for 1 hour until the reaction subsides and the evolution of gases ceases. The fusion mass is now cooled to 100°–120° C. and the naphthalene distilled off under vacuum. The temperature of the melt should not rise above 170° C. during the distillation. The fusion is then cooled to 100°–120° C. and carefully diluted with 1000 cc. of water. The mass is now slurried for ½ hour and poured into 1300 cc. of water. The diluted fusion is now heated to boil off any traces of naphthalene present. The mass is then diluted to 6000 cc. and filtered at 95°–100° C. The cake is then washed alkali and color free with hot water and dried.

Analysis by the dimethyl sulfate purification method shows an increase in yield of dibenzanthrone of 14% over the yield obtained by the same process where the sodium oxide is omitted.

We claim:

1. In the process for preparing dibenzanthrone wherein benzanthrone is fused with alcoholic caustic potash in a naphthalene melt in the presence of a flux of the class consisting of an alkali metal salt of a lower fatty acid and an alkali metal phenate, and in which an oxidizing agent is employed, the step which comprises carrying out the fusion with the addition of an alkali metal oxide thereto in an amount at least sufficient to take up the water present in the reaction mass.

2. In the process for preparing dibenzanthrone wherein benzanthrone is fused with alcoholic caustic potash in a naphthalene melt in the presence of sodium acetate and in which an oxidizing agent is employed, the step which comprises carrying out the fusion with the addition of sodium oxide thereto in an amount at least sufficient to take up any water that may be present in the reaction mass.

3. In the process for preparing dibenzanthrone wherein benzanthrone is fused with alcoholic caustic potash in a naphthalene melt in the presence of sodium acetate and sodium phenate and in which an oxidizing agent is employed, the step which comprises carrying out the fusion with the addition of sodium oxide thereto in an amount at least sufficient to take up any water that may be present in the reaction mass.

4. In the process for preparing dibenzanthrone wherein benzanthrone is fused with alcoholic caustic potash in a naphthalene melt in the presence of sodium phenate and in which an oxidizing agent is employed, the step which comprises carrying out the fusion with the addition of sodium oxide thereto in an amount at least sufficient to take up any water that may be present in the reaction mass.

WILLIAM R. WALDRON.
LYNNE H. ULICH.